UNITED STATES PATENT OFFICE.

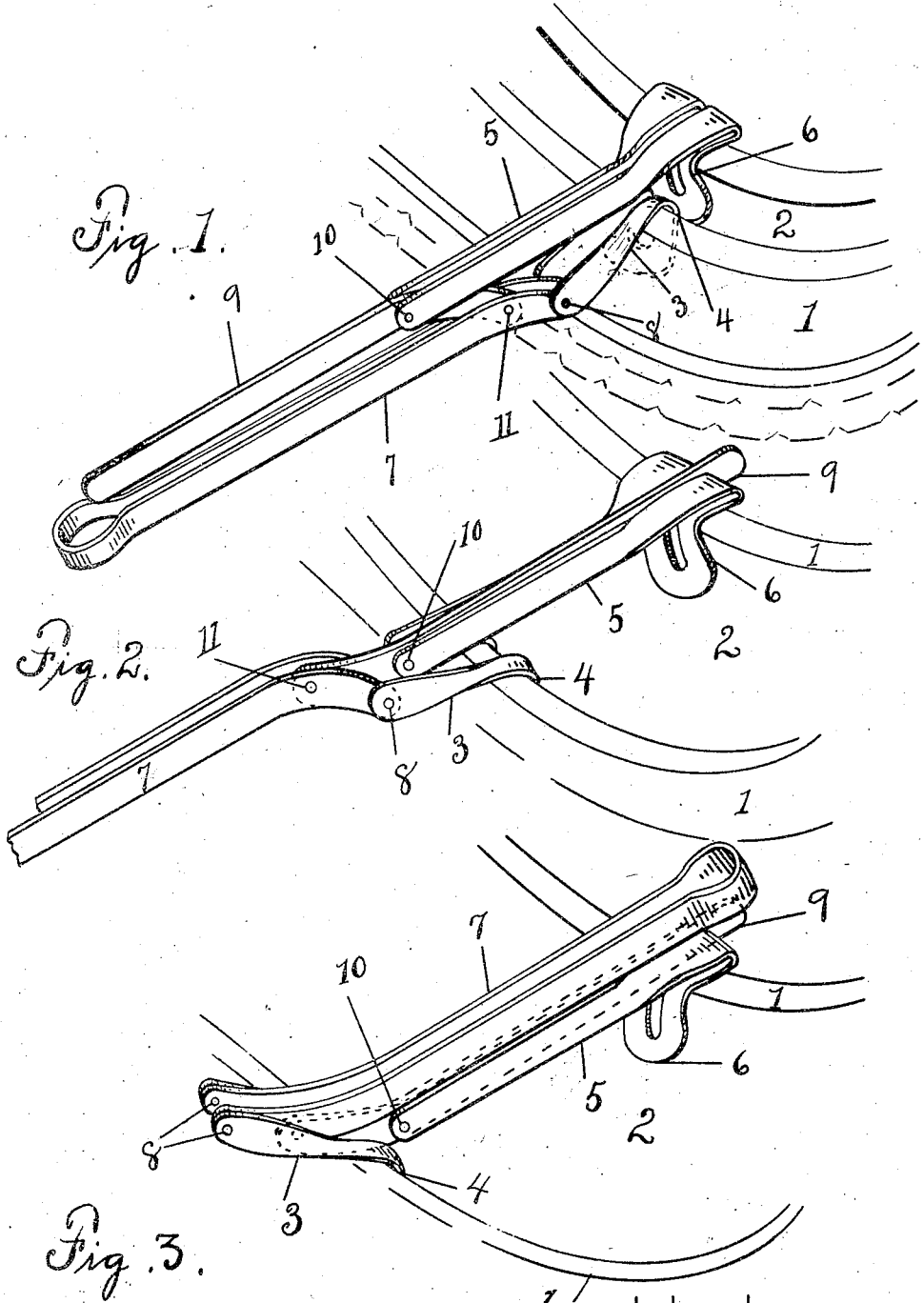

DONALD C. WOODWORTH, OF AUBURN, MAINE.

TIRE-SPREADER.

1,325,552.   Specification of Letters Patent.   Patented Dec. 23, 1919.

Application filed December 24, 1918. Serial No. 268,145.

*To all whom it may concern:*

Be it known that I, DONALD C. WOODWORTH, a citizen of the United States, residing at Auburn, in the county of Androscoggin and State of Maine, have invented certain new and useful Improvements in Tire-Spreaders, of which the following is a specification.

This invention relates to improvements in tire spreaders and is more particularly designed to spread the heavy truck tires to enable the operator to work inside the tire and to insert and remove the air bag when necessary. To spread such tires requires great power on account of the size and rigidity of the beads and a single lever to accomplish this purpose would have to be so long as to be cumbersome and inconvenient in storage and transportation.

In the drawings herewith accompanying and forming a part of this application, Figure 1 is a perspective view of a portion of the tire and my improved spreader applied thereto in ready position; Fig. 2 is a similar view showing the tire partially spread and Fig. 3 is a similar view showing the tire spread as far as it can be with my improved spreader.

The same reference characters indicate like parts in the several figures.

In said drawings, 1 represents a tire, 2 the circumferential opening in the tire. Referring now to my spreader, 3 represents one jaw member terminating in a jaw 4 and 5 represents the other jaw member terminating in a jaw 6. The jaw member 3 is bifurcated and has pivotally mounted therein a lever 7 on pivots 8. Jaw member 5 is also bifurcated and has a lever 9 pivotally mounted therein on a pivot 10. The inner end of lever 9 is turned downwardly and is pivotally connected to lever 7 by a pivot 11 spaced apart from pivot 10 in lever 9, whereby lever 9 is locked when turned into operative position, as shown in Fig. 2. It will be evident that the structure and arrangement of the jaw members and lever members may be varied at will provided the relative arrangement of the members and their pivot connections remain substantially the same.

From the foregoing description and drawings, the operation of my improved spreader can be readily understood. The spreader is first placed in the position shown in Fig. 1, the jaws resting against the adjacent inner edges of the beads. The outer lever 9 is then turned up and toward the tire, which results in spreading the tire. The movement is continued until the parts are in substantially the position shown in Fig. 2 in which the lever 9 is locked in position due to the location of the pivots. The member 7 is then turned toward the tire until it too assumes a locked position due to the location of the pivots. The advantages of my improved spreader are; that it is very powerful in operation, is capable of assuming a positively locked position, is very compact and convenient in operation and transportation.

I claim:

1. In a device of the character described, two jaw members each terminating in a jaw, a lever pivotally attached to one jaw member and a lever pivotally attached intermediate its ends to the other jaw member and having an end pivotally attached to the first mentioned lever.

2. In a device of the character described, two jaw members terminating in jaws, a lever pivotally attached to one jaw member and a lever pivotally attached to the other jaw member intermediate its ends and having an end turned downwardly and pivotally attached to the first mentioned lever.

3. In a device of the character described, two jaw members each having one end bifurcated and the other end terminating in a jaw, a lever bifurcated at one end and pivotally mounted in the bifurcated end of one jaw member and another lever pivotally mounted intermediate its ends in the bifurcated end of the other jaw member and having and end turned downwardly and pivotally attached to the first mentioned lever.

In testimony whereof I affix my signature December 10, A. D. 1918.

DONALD C. WOODWORTH.